(12) United States Patent
Sunkara et al.

(10) Patent No.: US 8,759,565 B2
(45) Date of Patent: Jun. 24, 2014

(54) POLYTRIMETHYLENE ETHER GLYCOL ESTERS

(75) Inventors: Hari Babu Sunkara, Hockessin, DE (US); Raja Hari Poladi, Bear, DE (US); Gyorgyi Fenyvesi, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 415 days.

(21) Appl. No.: 12/821,537

(22) Filed: Jun. 23, 2010

(65) Prior Publication Data

US 2010/0261932 A1 Oct. 14, 2010

Related U.S. Application Data

(62) Division of application No. 11/593,954, filed on Nov. 7, 2006.

(51) Int. Cl.
*C07C 67/08* (2006.01)
*C08G 65/46* (2006.01)

(52) U.S. Cl.
USPC ............ 560/91; 560/93; 560/98; 560/99; 560/129; 528/425; 528/499

(58) Field of Classification Search
USPC ........... 528/425, 499; 560/91, 93, 98, 99, 129
See application file for complete search history.

(56) References Cited

U.S. PATENT DOCUMENTS

| | | | |
|---|---|---|---|
| 2,481,278 A | 9/1949 | Ballard et al. | |
| 2,520,733 A | 8/1950 | Morris et al. | |
| 5,015,789 A | 5/1991 | Arntz et al. | |
| 5,276,201 A | 1/1994 | Haas et al. | |
| 5,284,979 A | 2/1994 | Haas et al. | |
| 5,334,778 A | 8/1994 | Haas et al. | |
| 5,364,984 A | 11/1994 | Arntz et al. | |
| 5,364,987 A | 11/1994 | Haas et al. | |
| 5,633,362 A | 5/1997 | Nagarajan et al. | |
| 5,686,276 A | 11/1997 | Laffend et al. | |
| 5,821,092 A | 10/1998 | Nagarajan et al. | |
| 5,962,745 A | 10/1999 | Brossmer et al. | |
| 6,140,543 A | 10/2000 | Brossmer et al. | |
| 6,232,511 B1 | 5/2001 | Haas et al. | |
| 6,235,948 B1 | 5/2001 | Sunkara et al. | |
| 6,277,289 B1 | 8/2001 | Kurian et al. | |
| 6,297,408 B1 | 10/2001 | Haas et al. | |
| 6,331,264 B1 | 12/2001 | Kurian et al. | |
| 6,342,646 B1 | 1/2002 | Haas et al. | |
| 6,720,459 B2 | 4/2004 | Sunkara et al. | |
| 6,977,291 B2 | 12/2005 | Sunkara et al. | |
| 7,038,092 B2 | 5/2006 | Sunkara et al. | |
| 2002/0049356 A1* | 4/2002 | Gunatillake et al. | 568/699 |
| 2004/0030095 A1 | 2/2004 | Sunkara et al. | |
| 2004/0225161 A1 | 11/2004 | Sunkara et al. | |
| 2004/0225162 A1 | 11/2004 | Sunkara et al. | |
| 2004/0260125 A1 | 12/2004 | Seapan et al. | |
| 2005/0020805 A1 | 1/2005 | Sunkara et al. | |
| 2005/0069997 A1 | 3/2005 | Adkesson et al. | |

FOREIGN PATENT DOCUMENTS

JP 2004-182974 7/2004

OTHER PUBLICATIONS

Currie, "Source Apportionment of Atmospheric Particles", Environmental Particles, vol. 1 (1992), pp. 3-74.
Weber et al., "C-Pattern of Natural Glycerol: Origin and Practical Importance", J. Agric. Food Chem., 45 (1997), pp. 2042-2046.

* cited by examiner

*Primary Examiner* — Ling Choi
*Assistant Examiner* — Gennadiy Mesh

(57) ABSTRACT

Disclosed are processes to prepare monocarboxylic acid esters (mono- and/or diesters) of polytrimethylene ether glycol that are substantially free of residues from the catalyst used to produce the polytrimethylene ether glycol esters, as well as methods for their preparation and end uses thereof. The esters, such as the bis-2-ethylhexanoate esters, have uses as functional fluids.

5 Claims, No Drawings

POLYTRIMETHYLENE ETHER GLYCOL ESTERS

FIELD OF THE INVENTION

This invention relates to processes for making monocarboxylic acid esters (monoesters and/or diesters) of polytrimethylene ether glycol.

BACKGROUND OF THE INVENTION

Certain monocarboxylic acid mono- and diesters of polytrimethylene ether glycol are expected to have properties that make them useful in a variety of fields, including as lubricants; however, no methods of preparation of such esters are known that produce products with the required purity and stability for such end uses.

Esters, in particular the 2-ethylhexanoate ester of polytrimethylene ether glycol and of trimethylene glycol-ethylene glycol copolymer, are disclosed in U.S. Pat. No. 2,520,733 and U.S. Pat. No. 2,481,278, respectively. In both cases the polyether glycol is prepared by p-toluenesulfonic acid catalyzed condensation of 1,3-propanediol or a mixture of 1,3-propanediol and ethylene glycol. The disclosed procedure for esterification of the resulting glycols, however, has two important deficiencies. First, the process utilizes an organic solvent (benzene) in the examples, thus making it unattractive in terms of economics and efficiency. Second, the resulting product contains sulfonic acid esters derived from the polymerization catalyst. The resulting product, therefore, is not useful for high temperature applications where these esters can undergo hydrolysis and the resulting sulfonic acid can degrade the product.

SUMMARY OF THE INVENTION

One aspect of the present invention is a process for preparing a composition comprising a polytrimethylene ether glycol ester comprising:

(a) polycondensing a hydroxyl-groups containing reactant comprising at least 50 mole % 1,3-propanediol reactant in the presence of a first acid catalyst to obtain a polytrimethylene ether glycol composition comprising a polytrimethylene ether glycol;

(b) esterifying the polytrimethylene ether glycol from the polytrimethylene ether glycol composition by heating it with a monocarboxylic acid of the formula R—COOH, wherein R is an organic group containing from 6 to 40 carbon atoms, and/or a monocarboxylic acid equivalent thereof, in the presence of a second acid catalyst to obtain a crude polytrimethylene ether glycol ester containing a residual acid ester of the second acid catalyst, the first acid catalyst or both;

(c) hydrolyzing a substantial portion of the residual acid ester in the crude ester by heating with water to form a mixture of water and polytrimethylene ether glycol ester;

(d) removing a substantial portion of the water to obtain a substantially dry polytrimethylene ether glycol ester that is substantially free of the residual acid ester.

Preferably the process steps are carried out in the substantial absence of an organic solvent.

Also, preferably, the first acid catalyst (first mineral acid catalyst) and the second acid catalyst (second mineral acid catalyst) are the same. More preferably, the second acid catalyst (second mineral acid catalyst) is the remainder of the first acid catalyst (first mineral acid catalyst) from step (a). In other words, it is preferred that the polytrimethylene ether glycol composition from step (a) is utilized directly in step (b) with no additional catalyst added.

The present invention provides stable polytrimethylene ether glycol esters that are substantially free of acid catalyst residues, and are preferably produced by a process that utilizes substantially no organic solvents.

In addition, the polytrimethylene ether glycol esters can made partially or wholly from renewable raw materials and, therefore, have a reduced environmental impact.

DETAILED DESCRIPTION OF THE PREFERRED EMBODIMENTS

All publications, patent applications, patents and other references mentioned herein, if not otherwise indicated, are explicitly incorporated by reference herein for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of "a" or "an" are employed to describe elements and components of the invention. This is done merely for convenience and to give a general sense of the invention. This description should be read to include one or at least one and the singular also includes the plural unless it is apparent from context that it is meant otherwise.

The materials, methods, and examples herein are illustrative only and, except as specifically stated, are not intended to be limiting. Although methods and materials similar or equivalent to those described herein can be used in the practice or testing of the present invention, suitable methods and materials are described herein.

As indicated previously, the invention described herein relates to a composition comprising an ester (a monoester, a diester or mixtures thereof) of a polytrimethylene ether glycol, obtained by the acid catalyzed esterification of the polytrimethylene ether glycol with a specified monocarboxylic acid (or equivalent), wherein the composition is substantially free of acid ester residues from the esterification acid catalyst.

When a sulfur-based acid catalyst is utilized (such as sulfuric acid), the composition preferably contains less than about 20 ppm, more preferably less than about 10 ppm, of sulfur.

The compositions of the present invention can be described as comprising one or more compounds of the formula (I):

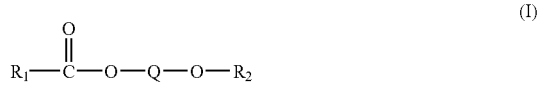

wherein Q represents the residue of a polytrimethylene ether glycol after abstraction of the hydroxyl groups, $R_2$ is H or $R_3CO$, and each of $R_1$ and $R_3$ is individually a substituted or unsubstituted aromatic, saturated aliphatic, unsaturated aliphatic, or cycloaliphatic organic group containing from 6 to 40 carbon atoms.

Polytrimethylene ether glycol esters are preferably prepared by polycondensation of hydroxyl groups-containing monomers (monomers containing 2 or more hydroxyl groups) predominantly comprising 1,3-propanediol to form polytrimethylene ether glycol, followed by esterification with a monocarboxylic acid (or equivalent).

The ester compositions preferably comprise from about 50 to 100 wt %, more preferably from about 75 to 100 wt %, diester and from 0 to about 50 wt %, more preferably from 0 to about 25 wt %, monoester, based on the total weight of the esters. Preferably the mono- and diesters are esters of 2-ethylhexanoic acid.

Polytrimethylene Ether Glycol (PO3G)

PO3G for the purposes of the present invention is an oligomeric or polymeric ether glycol in which at least 50% of the repeating units are trimethylene ether units. More preferably from about 75% to 100%, still more preferably from about 90% to 100%, and even more preferably from about 99% to 100%, of the repeating units are trimethylene ether units.

PO3G is preferably prepared by polycondensation of monomers comprising 1,3-propanediol, thus resulting in polymers or copolymers containing —($CH_2CH_2CH_2O$)— linkage (e.g, trimethylene ether repeating units). As indicated above, at least 50% of the repeating units are trimethylene ether units.

In addition to the trimethylene ether units, lesser amounts of other units, such as other polyalkylene ether repeating units, may be present. In the context of this disclosure, the term "polytrimethylene ether glycol" encompasses PO3G made from essentially pure 1,3-propanediol, as well as those oligomers and polymers (including those described below) containing up to about 50% by weight of comonomers.

The 1,3-propanediol employed for preparing the PO3G may be obtained by any of the various well known chemical routes or by biochemical transformation routes. Preferred routes are described in, for example, U.S. Pat. No. 5,015,789, U.S. Pat. No. 5,276,201, U.S. Pat. No. 5,284,979, U.S. Pat. No. 5,334,778, U.S. Pat. No. 5,364,984, U.S. Pat. No. 5,364,987, U.S. Pat. No. 5,633,362, U.S. Pat. No. 5,686,276, U.S. Pat. No. 5,821,092, U.S. Pat. No. 5,962,745, U.S. Pat. No. 6,140,543, U.S. Pat. No. 6,232,511, U.S. Pat. No. 6,235,948, U.S. Pat. No. 6,277,289, U.S. Pat. No. 6,297,408, U.S. Pat. No. 6,331,264, U.S. Pat. No. 6,342,646, U.S. Pat. No. 7,038,092, US20040225161A1, US20040260125A1, US20040225162A1 and US20050069997A1, the disclosures of which are incorporated by reference herein for all purposes as if fully set forth.

Preferably, the 1,3-propanediol is obtained biochemically from a renewable source ("biologically-derived" 1,3-propanediol).

A particularly preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species Klebsiella, Citrobacter, Clostridium, and Lactobacillus. The technique is disclosed in several publications, including previously incorporated U.S. Pat. No. 5,633,362, U.S. Pat. No. 5,686,276 and U.S. Pat. No. 5,821,092 (the disclosures of which are incorporated by reference herein for all purposes as if fully set forth). U.S. Pat. No. 5,821,092 discloses, inter alia, a process for the biological production of 1,3-propanediol from glycerol using recombinant organisms. The process incorporates E. coli bacteria, transformed with a heterologous pdu diol dehydratase gene, having specificity for 1,2-propanediol. The transformed E. coli is grown in the presence of glycerol as a carbon source and 1,3-propanediol is isolated from the growth media. Since both bacteria and yeasts can convert glucose (e.g., corn sugar) or other carbohydrates to glycerol, the processes disclosed in these publications provide a rapid, inexpensive and environmentally responsible source of 1,3-propanediol monomer.

The biologically-derived 1,3-propanediol, such as produced by the processes described and referenced above, contains carbon from the atmospheric carbon dioxide incorporated by plants, which compose the feedstock for the production of the 1,3-propanediol. In this way, the biologically-derived 1,3-propanediol preferred for use in the context of the present invention contains only renewable carbon, and not fossil fuel-based or petroleum-based carbon. The PO3G and elastomers based thereon utilizing the biologically-derived 1,3-propanediol, therefore, have less impact on the environment as the 1,3-propanediol used in the compositions does not deplete diminishing fossil fuels and, upon degradation, releases carbon back to the atmosphere for use by plants once again. Thus, the compositions of the present invention can be characterized as more natural and having less environmental impact than similar compositions comprising petroleum based glycols.

The biologically-derived 1,3-propanediol, PO3G and PO3G esters, may be distinguished from similar compounds produced from a petrochemical source or from fossil fuel carbon by dual carbon-isotopic finger printing. This method usefully distinguishes chemically-identical materials, and apportions carbon in the copolymer by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," *Characterization of Environmental Particles*, J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship:

$$t=(-5730/0.693)\ln(A/A_0)$$

wherein t=age, 5730 years is the half-life of radiocarbon, and A and $A_0$ are the specific $^{14}C$ activity of the sample and of the modern standard, respectively (Hsieh, Y., *Soil Sci. Soc. Am J.*, 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2 \times 10^{-12}$, with an approximate relaxation "half-life" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-Industrial Revolution wood. For the current living biosphere (plant material), $f_M \approx 1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding $\delta^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects, the most significant of which for the instant invention is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. −10 to −14 per mil ($C_4$) and −21 to −26 per mil ($C_3$) (Weber et al., *J. Agric. Food Chem.*, 45, 2942 (1997)). Coal and petroleum fall generally in this latter range. The $^{13}C$ measurement scale was originally defined by a zero set by pee dee belemnite (PDB) limestone, where values are given in parts per thousand deviations from this material. The "$\delta^{13}C$" values are in parts per thousand (per mil), abbreviated ‰, and are calculated as follows:

$$\delta^{13}C \equiv \frac{(^{13}C/^{12}C)\text{sample} - (^{13}C/^{12}C)\text{standard}}{(^{13}C/^{12}C)\text{standard}} \times 1000^{0/00}$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Biologically-derived 1,3-propanediol, and compositions comprising biologically-derived 1,3-propanediol, therefore, may be completely distinguished from their petrochemical derived counterparts on the basis of $^{14}C$ ($f_M$) and dual carbon-isotopic fingerprinting, indicating new compositions of matter. The ability to distinguish these products is beneficial in tracking these materials in commerce. For example, products comprising both "new" and "old" carbon isotope profiles may be distinguished from products made only of "old" materials. Hence, the instant materials may be followed in commerce on the basis of their unique profile and for the purposes of defining competition, for determining shelf life, and especially for assessing environmental impact.

Preferably the 1,3-propanediol used as the reactant or as a component of the reactant will have a purity of greater than about 99%, and more preferably greater than about 99.9%, by weight as determined by gas chromatographic analysis. Particularly preferred are the purified 1,3-propanediols as disclosed in previously incorporated U.S. Pat. No. 7,038,092, US20040260125A1, US20040225161A1 and US20050069997A1, as well as PO3G made therefrom as disclosed in US20050020805A1 (the disclosures of which are incorporated by reference herein for all purposes as if fully set forth).

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having L*a*b*"b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

The starting material for making PO3G will depend on the desired PO3G, availability of starting materials, catalysts, equipment, etc., and comprises "1,3-propanediol reactant." By "1,3-propanediol reactant" is meant 1,3-propanediol, and oligomers and prepolymers of 1,3-propanediol preferably having a degree of polymerization of 2 to 9, and mixtures thereof. In some instances, it may be desirable to use up to 10% or more of low molecular weight oligomers where they are available. Thus, preferably the starting material comprises 1,3-propanediol and the dimer and trimer thereof. A particularly preferred starting material is comprised of about 90% by weight or more 1,3-propanediol, and more preferably 99% by weight or more 1,3-propanediol, based on the weight of the 1,3-propanediol reactant.

PO3G can be made via a number of processes known in the art, such as disclosed in U.S. Pat. No. 6,977,291 and U.S. Pat. No. 6,720,459. A preferred process is as set forth in previously incorporated US20050020805A1.

As indicated above, PO3G may contain lesser amounts of other polyalkylene ether repeating units in addition to the trimethylene ether units. The monomers for use in preparing polytrimethylene ether glycol can, therefore, contain up to 50% by weight (preferably about 20 wt % or less, more preferably about 10 wt % or less, and still more preferably about 2 wt % or less), of comonomer polyols in addition to the 1,3-propanediol reactant. Comonomer polyols that are suitable for use in the process include aliphatic diols, for example, ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluoro-1,5-pentanediol, 2,2,3,3,4,4,5,5-octafluoro-1,6-hexanediol, and 3,3,4,4,5,5,6,6,7,7,8,8,9,9,10,10-hexadecafluoro-1,12-dodecanediol; cycloaliphatic diols, for example, 1,4-cyclohexanediol, 1,4-cyclohexanedimethanol and isosorbide; and polyhydroxy compounds, for example, glycerol, trimethylolpropane, and pentaerythritol. A preferred group of comonomer diols is selected from the group consisting of ethylene glycol, 2-methyl-1,3-propanediol, 2,2-dimethyl-1,3-propanediol, 2,2-diethyl-1,3-propanediol, 2-ethyl-2-(hydroxymethyl)-1,3-propanediol, $C_6$-$C_{10}$ diols (such as 1,6-hexanediol, 1,8-octanediol and 1,10-decanediol) and isosorbide, and mixtures thereof. A particularly preferred diol other than 1,3-propanediol is ethylene glycol, and $C_6$-$C_{10}$ diols can be particularly useful as well.

One preferred PO3G containing comonomers is poly(trimethylene-ethylene ether) glycol such as described in US2004/0030095A1 (the disclosure of which is incorporated by reference herein for all purposes as if fully set forth). Preferred poly(trimethylene-ethylene ether) glycols are prepared by acid catalyzed polycondensation of from 50 to about 99 mole % (preferably from about 60 to about 98 mole %, and more preferably from about 70 to about 98 mole %) 1,3-propanediol and up to 50 to about 1 mole % (preferably from about 40 to about 2 mole %, and more preferably from about 30 to about 2 mole %) ethylene glycol.

The preferred PO3G for use in the invention has an Mn (number average molecular weight) of at least about 250, more preferably at least about 1000, and still more preferably at least about 2000. The Mn is preferably less than about 5000, more preferably less than about 4000, and still more preferably less than about 3500. Blends of PO3Gs can also be used. For example, the PO3G can comprise a blend of a higher and a lower molecular weight PO3G, preferably wherein the higher molecular weight PO3G has a number average molecular weight of from about 1000 to about 5000, and the lower molecular weight PO3G has a number average molecular weight of from about 200 to about 950. The Mn of the blended PO3G will preferably still be in the ranges mentioned above.

PO3G preferred for use herein is typically polydisperse having a polydispersity (i.e. Mw/Mn) of preferably from about 1.0 to about 2.2, more preferably from about 1.2 to about 2.2, and still more preferably from about 1.5 to about 2.1. The polydispersity can be adjusted by using blends of PO3G.

PO3G for use in the present invention preferably has a color value of less than about 100 APHA, and more preferably less than about 50 APHA.

Monocarboxylic Acid and Equivalents

The esterification of the PO3G is carried out by reaction with a monocarboxylic acid and/or equivalent.

By "monocarboxylic acid equivalent" is meant compounds that perform substantially like monocarboxylic acids in reaction with polymeric glycols and diols, as would be generally recognized by a person of ordinary skill in the relevant art. Monocarboxylic acid equivalents for the purpose of the present invention include, for example, esters of monocarboxylic acids, and ester-forming derivatives such as acid halides (e.g., acid chlorides) and anhydrides.

Preferably, a monocarboxylic acid is used having the formula R—COOH, wherein R is a substituted or unsubstituted aromatic, aliphatic or cycloaliphatic organic moiety containing from 6 to 40 carbon atoms.

Mixtures of different monocarboxylic acids and/or equivalents are also suitable.

As indicated above, the monocarboxylic acid (or equivalent) can be aromatic, aliphatic or cycloaliphatic. In this regard, "aromatic" monocarboxylic acids are monocarboxylic acids in which a carboxyl group is attached to a carbon atom in a benzene ring system such as those mentioned below. "Aliphatic" monocarboxylic acids are monocarboxylic acids in which a carboxyl group is attached to a fully saturated carbon atom or to a carbon atom which is part of an olefinic double bond. If the carbon atom is in a ring, the equivalent is "cycloaliphatic."

The monocarboxylic acid (or equivalent) can contain any substituent groups or combinations thereof (such as functional groups like amide, amine, carbonyl, halide, hydroxyl, etc.), so long as the substituent groups do not interfere with the esterification reaction or adversely affect the properties of the resulting ester product.

The monocarboxylic acids and equivalents can be from any source, but preferably are derived from natural sources or are bio-derived.

The following acids and their derivatives are specifically preferred: lauric, myristic, palmitic, stearic, arachidic, benzoic, caprylic, palmitic, erucic, palmitoleic, pentadecanoic, heptadecanoic, nonadecanoic, linoleic, arachidonic, oleic, valeric, caproic, capric and 2-ethylhexanoic acids, and mixtures thereof. Particularly preferred acids or derivatives thereof are 2-ethylhexanoic acid, benzoic acid, stearic acid and oleic acid.

Esterification Process

For preparation of the esters, the PO3G can be contacted, preferably in the presence of an inert gas, with the monocarboxylic acid(s) at temperatures ranging from about 100° C. to about 275° C., preferably from about 125° C. to about 250° C. The process can be carried out at atmospheric pressure or under vacuum. During the contacting water is formed is formed and can be removed in the inert gas stream or under vacuum to drive the reaction to completion.

To facilitate the reaction of PO3G with carboxylic acid an esterification catalyst is generally used, preferably a mineral acid catalyst. Examples of mineral acid catalysts include but are not restricted to sulfuric acid, hydrochloric acid, phosphoric acid, hydriodic acid, and heterogeneous catalysts such as zeolites, heteropolyacid, amberlyst, and ion exchange resin. Preferred esterification acid catalysts are selected from the group consisting of sulfuric acid, phosphoric acid, hydrochloric acid and hydroiodic acid. A particularly preferred mineral acid catalyst is sulfuric acid.

The amount of catalyst used can be from about 0.01 wt % to about 10 wt % of the reaction mixture, preferably from 0.1 wt % to about 5 wt %, and more preferably from about 0.2 wt % to about 2 wt %, of the reaction mixture.

Any ratio of carboxylic acid, or derivatives thereof, to glycol hydroxyl groups can be used. The preferred ratio of acid to hydroxyl groups is from about 3:1 to about 1:2, where the ratio can be adjusted to shift the ratio of monoester to diester in the product. Generally to favor production of diesters slightly more than a 1:1 ratio is used. To favor production of monoesters, a 0.5:1 ratio or less of acid to hydroxyl is used.

A preferred method for esterification comprises polycondensing 1,3-propanediol reactant to polytrimethylene ether glycol using a mineral acid catalyst, then adding carboxylic acid and carrying out the esterifcation without isolating and purifying the PO3G. In this method, the etherfication or polycondensation of 1,3-propanediol reactant to form polytrimethylene ether glycol is carried out using an acid catalyst as disclosed in U.S. Pat. No. 6,977,291 and U.S. Pat. No. 6,720,459. The etherification reaction may also be carried out using a polycondensation catalyst that contains both an acid and a base as described in JP2004-182974A. The polycondensation or etherification reaction is continued until desired molecular weight is reached, and then the calculated amount of monocarboxylic acid is added to the reaction mixture. The reaction is continued while the water byproduct is removed. At this stage both esterification and etherification reactions occur simultaneously. Thus, in this preferred esterification method the acid catalyst used for polycondensation of diol is also used for esterification. If necessary additional esterification catalyst can be added at the esterification stage.

In an alternative procedure, the esterification reaction can be carried out on purified PO3G by addition of an esterification catalyst and carboxylic acid followed by heating and removal of water.

Regardless of which esterification procedure is followed, after the esterification step any by products are removed, and then the catalyst residues remaining from polycondensation and/or esterification are removed in order to obtain an ester product that is stable, particularly at high temperatures. This may be accomplished by hydrolysis of the crude ester product by treatment with water at form about 80° C. to about 100° C. for a time sufficient to hydrolyze any residual acid esters derived from the catalyst without impacting significantly the carboxylic acid esters. The time required can vary from about 1 to about 8 hours. If the hydrolysis is carried out under pressure, higher temperatures and correspondingly shorter times are possible. At this point the product may contain diesters, monoesters, or a combination of diesters and monoesters, and small amounts of acid catalyst, unreacted carboxylic acid and diol depending on the reaction conditions. The hydrolyzed polymer is further purified to remove water, acid catalyst and unreacted carboxylic acid by the known conventional techniques such as water washings, base neutralization, filtration and/or distillation. Unreacted diol and acid catalyst can, for example, be removed by washing with deionized water. Unreacted carboxylic acid also can be removed, for example, by washing with deionized water or aqueous base solutions, or by vacuum stripping.

Hydrolysis is generally followed by one or more water washing steps to remove acid catalyst, and drying, preferably under vacuum, to obtain the ester product. The water washing also serves to remove unreacted diol. Any unreacted monocarboxylic acid present may also be removed in the water washing, but may also be removed by washing with aqueous base or by vacuum stripping.

If desired, the product can be fractionated further to isolate low molecular weight esters by a fractional distillation under reduced pressure.

Proton NMR and wavelength X-ray fluorescence spectroscopic methods can be used to identify and quantify any residual catalyst (such as sulfur) present in the polymer. The proton NMR can, for example, identify the sulfate ester groups present in the polymer chain, and wavelength x-ray fluorescence method can determine the total sulfur (inorganic and organic sulfur) present in the polymer. The esters of the invention made from the process described above are substantially sulfur free and thus useful for high temperature applications.

Preferably, the PO3G esters after purification have essentially no acid catalyst end groups, but may contain very low levels of unsaturated end groups, predominately allyl end groups, in the range of from about 0.003 to about 0.03 meq/g. Such PO3G ester can be considered to comprise (consist essentially of) the compounds having the following formulae (II) and (III):

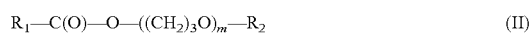

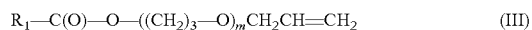

wherein Q represents the residue of a polytrimethylene ether glycol after abstraction of the hydroxyl groups; $R_2$ is H or $R_3C(O)$; each of $R_1$ and $R_3$ is individually a substituted or unsubstituted aromatic, saturated aliphatic, unsaturated aliphatic, or cycloaliphatic organic group containing from 6 to 40 carbon atoms; m is in a range such that the Mn is within the range of from about 200 to about 5000; and with compounds of formula (III) being present in an amount such that the allyl end groups (preferably all unsaturation ends or end groups) are present in the range of from about 0.003 to about 0.03 meq/g.

The esters of the invention, in particular the bis-2-ethylhexanoate esters, have uses as functional fluids, including for example lubricants, transformer fluids, heat transfer fluids, plasticizer and personal care vehicles.

EXAMPLES

The present invention is further defined in the following examples. These examples, while indicating preferred embodiments of the invention, are presented by way of illustration only. From the above discussion and these examples, one skilled in the art can ascertain the essential characteristics of this invention, and without departing from the spirit and scope thereof, can make various changes and modifications of the invention to adapt it to various usages and conditions.

All parts, percentages, etc., are by weight unless otherwise indicated.

The 1,3-propanediol utilized in the examples was prepared by biological methods described in US2005-0069997A1, and had a purity of >99.8%

The number average molecular weights (Mn) were determined by end-group analysis using NMR spectroscopic method. This method was also used to identify and quantify the sulfate esters and unreacted carboxylic acids in the polymer.

The amount of total sulfur in the polymer was determined by analyzing the samples using a wavelength dispersive X-ray fluorescence (WDXRF) spectroscopy (PANalytical Model PW2400 WDXRD spectrometer).

Example 1

This example describes the synthesis of a 2-ethylhexanoate ester of polytrimethylene ether glycol.

1,3-propanediol (2.4 kg, 31.5 moles) was charged into a 5 L flask fitted with a stirrer, a condenser and an inlet for nitrogen. The liquid in the flask was flushed with dry nitrogen for 30 minutes at room temperature and then heated to 170° C. while being stirred at 120 rpm. When the temperature reached 170° C., 12.6 g (0.5 wt %) of concentrated sulfuric acid was added. The reaction was allowed to proceed at 170° C. for 3 hours, and then the temperature was raised to 180° C. and held at 180° C. for 135 minutes. A total of 435 mL of distillate was collected. The reaction mixture was cooled, and then 2.24 kg (14.6 moles) of 2-ethylhexanoic acid (99%) was added. The reaction temperature was then raised to 160° C. under nitrogen flow with continuous agitation at 180 rpm and maintained at that temperature for 6 hours. During this period an additional 305 mL of distillate water was collected. Heating and agitation were stopped and the reaction mixture was allowed to settle. The product was decanted from about 5 g of a lower, immiscible by-product phase. NMR analysis of the by-product phase confirmed that no carboxylic acid esters were present.

2.0 kg of the polytrimethylene ether glycol ester product was mixed with 0.5 kg of water, and then the resulting mixture was heated at 95° C. for 6 hours. The aqueous phase was separated from the polymer phase, and then the polymer phase was washed twice with 2.0 kg of water. The resulting product was heated at 120° C. at 200 mTorr to remove volatiles (255 g).

The resulting ester product was analyzed using proton NMR. No peaks associated with sulfate esters and unreacted 2-ethylhexanoic acid were found. The calculated number average molecular weight was found to be 525. There was no sulfur detected in the polymer when analyzed using WDXRF spectroscopy method.

Comparative Example 1

This comparative example describes preparation of the 2-ethylhexanoate ester of polytrimethylene ether glycol prepared without hydrolyzing the residual acid esters in the crude ester. This corresponds to the procedures described in U.S. Pat. No. 2,520,733.

A mixture of 300 g (3.95 moles) of 1,3-propanediol and 6.1 g of p-toluenesulfonic acid monohydrate (2 wt %) was charged to a 2 L reaction flask as described in Example 1 and flushed with dry nitrogen gas for 30 minutes to remove air and moisture. The contents of the flask were then heat to 180° C. and held at that temperature for 8 hours, during which time 56.9 g of by-product distilled out of the reaction mixture. After the product was cooled, 124 g (0.85 moles) of 2-ethylhexanoic acid and 308 g of toluene were added, and the resulting mixture was heat at 110° C. for 12 hours. The resulting reaction mixture was cooled and then transferred to a separatory funnel. Distilled water (1000 mL) was added, and the resulting mixture was agitated, allowed to separate followed by removal of the aqueous layer. The water washing was repeated 4 times. The organic layer was collected, and then the toluene was removed under reduced pressure.

Analysis of the product 2-ethylhexanoate ester by $^1$H NMR in DMSO-$d_6$ indicated peaks of the p-toluenesulfonate ester group (7.5 and 7.8 ppm) and unreacted p-toluenesulfonic acid group (7.1 and 7.5 ppm). Further analysis of the polymer by X-ray fluorescence showed the presence of 1000 ppm of sulfur. Thus, the ester obtained using the conditions described in U.S. Pat. No. 2,520,733 contains significant amount of acid catalyst residues.

Comparative Example 2

This comparative example describes an attempt to hydrolyze the p-toluenesulfonate ester groups present in the polymer obtained from Comparative Example 1.

A fraction of the product (50 g) was mixed with 50 mL of distilled water, and the resulting mixture was refluxed for 6 hours. The aqueous phase was removed, and the organic phase was washed with water four times and then dried under reduced pressure.

Analysis of the resulting polymer by proton NMR still showed peaks associated with p-toluenesulfonate ester groups at 7.5 and 7.8 ppm, but no peaks corresponding to p-toluenesulfonic acid. Analysis of the polymer by X-ray fluorescence showed a decreased total sulfur amount from 1000 to 420 ppm suggesting incomplete hydrolysis of sulfonate esters under the above reaction conditions.

These results indicate that the conditions described in U.S. Pat. No. 2,520,733 do not provide organic ester of polytrimethylene ether glycol that is free of residues from the acid catalyst used to produce the polytrimethylene ether glycol.

Example 2

In this example the ester obtained in Example 1 was fractionated into several fractions of differing molecular weights.

The product obtained in Example 1 was passed through a short path distillation apparatus under conditions of 160° C., 130 mTorr and a flow rate of 7 mL/minute. Two fractions were collected. The volatile fraction had a number average molecular weight of 370. The non-volatile fraction was once again passed through the short path distillation unit at 180° C., 110 mTorr and a flow rate of 4.5 mL. The volatile fraction from this run had a number average molecular weight of 460, corresponding largely to trimer and tetramer esters.

Example 3

This example describes the preparation of the 2-ethylhexanoate ester of polytrimethylene ether glycol of higher molecular weight than that prepared in Example 1.

The raw materials and procedure were the same as those described in Example 1, with the exceptions that the amount of sulfuric acid was increased to 14.9 g (0.6 wt %) and the polymerization time was increased from 315 to 525 minutes. A total of 545.3 ml of distillate was collected during polymerization. The esterification was carried out by adding 943.8 g (6.5 moles) of 2-ethylhexanoic acid as described in Example 1. The distillate collected during esterification was 113 ml.

After hydrolysis, the product was purified by neutralizing free sulfuric acid remaining in the product. The neutralization was carried out as follows. The product (1516 g) was transferred to a reaction flask, 0.15 g of Ca(OH)$_2$ in 15 mL of deionized water was added, and the mixture was heated to 70° C. while stirring under nitrogen stream. The neutralization was continued for 3 hours and then the product was dried at 110° C. for 2 hours under reduced pressure and filtered to remove solids. After filtration, the product was analyzed and found to have a number average molecular weight of 870.

Example 4

This example describes a copolyether glycol ester.

1,3-propanediol (0.762 kg, 10 moles) and ethylene glycol (0.268 kg, 4.32 moles) were charged into a 5 L flask fitted with a stirrer, a condenser and an inlet for nitrogen. The liquid in the flask was flushed with dry nitrogen for 30 minutes at room temperature and then heated to 170° C. while being stirred at 120 rpm. When the temperature reached 170° C., 5.2 g (0.5 wt %) of concentrated sulfuric acid was added. The reaction was allowed to proceed at 170° C. for 3 hours, and then the temperature was raised to 180° C. and held at 180° C. for 135 minutes. A total of 258 mL of distillate was collected. The reaction mixture was cooled, and then 0.5 kg kg (3.4 moles) of 2-ethylhexanoic acid (99%) was added. The reaction temperature was then raised to 160° C. under nitrogen flow with continuous agitation at 180 rpm and maintained at that temperature for 6 hours. During this period an additional 63 mL of distillate water was collected. The product was hydrolyzed and purified as described in Example 1.

The resulting ester product was analyzed using proton NMR. No peaks associated with sulfate esters and unreacted 2-ethylhexanoic acid were found. The calculated number average molecular weight was found to be 620. There was no sulfur detected in the polymer when analyzed using WDXRF spectroscopy method.

Example 5

This example describes the synthesis of polytrimethylene ether glycol stearate 1,3-propanediol (1.504 kg, 19.8 moles) was charged into a 5 L flask fitted with a stirrer, a condenser and an inlet for nitrogen. The liquid in the flask was flushed with dry nitrogen for 30 minutes at room temperature and then heated to 170° C. while being stirred at 120 rpm. When the temperature reached 170° C., 7.8 g (0.5 wt %) of concentrated sulfuric acid was added. The reaction was allowed to proceed at 170° C. for 3 hours, and then the temperature was raised to 180° C. and held at 180° C. for 140 minutes. A total of 276 mL of distillate was collected. After the reaction mixture was cooled, 0.1 kg of the product was transferred into 1 L flask fitted with a stirrer, a condenser and an inlet for nitrogen, and then 0.188 kg kg (0.66 moles) of stearic acid was added. The reaction temperature was then raised to 140° C. under nitrogen flow with continuous agitation at 180 rpm and maintained at that temperature for 3 hours. During this period an additional 10 mL of distillate water was collected. The product was hydrolyzed as described in Example 1. After separating the aqueous layer, the product was dispersed in warm water and filtered.

The resulting ester product was analyzed using proton NMR. No peaks associated with sulfate esters and unreacted stearic acid were found. The calculated number average molecular weight was found to be 780. There was no sulfur detected in the polymer when analyzed using WDXRF spectroscopy method

What is claimed is:

1. A process for preparing a composition comprising a polytrimethylene ether glycol ester comprising:
    (a) polycondensing, a hydroxyl groups containing reactant comprising at least 50 mole % 1,3-propanediol in the presence sulfuric acid to obtain a polytrimethylene ether glycol composition;
    (b) esterifying, the polytrimethylene ether glycol composition by heating it with a monocarboxylic acid of the formula R—COOH, wherein R is an organic group containing from 6 to 40 carbon atoms, and/or a monocarboxylic acid equivalent thereof, in the presence of sulfuric acid to obtain a crude polytrimethylene ether glycol ester containing a residual sulfuric acid ester;
    (c) hydrolyzing the residual sulfuric acid ester of the crude ester by heating with water at a temperature from 80° C. to 100° C. for 1 to 8 hours, wherein water is present in the 20 weight percent relative to the total weight of the water and crude ester; and
    (d) removing the water to obtain a polytrimethylene ether glycol ester that has less than 20 ppm of residual sulfur, and wherein the process steps (a), (b), (c) and (d) are carried out in the absence of an organic solvent.

2. The process of claim 1, wherein the monocarboxylic acid comprises 2-ethylhexanoic acid, benzoic acid, stearic acid and/or oleic acid.

3. The process of claim 1, wherein the polytrimethylene ether glycol ester comprises from about 50 to 100 wt % diester and from 0 to about 50 wt % monoester, based on the weight of the polytrimethylene ether glycol ester.

4. The process of claim 1, wherein the 1,3-propanediol is produced by a fermentation process using a renewable biological source.

5. The process of claim 1, wherein the number average molecular weight of the polytrimethylene ether glycol is from about 250 to about 5000.

* * * * *